Aug. 28, 1956 N. G. DODSON 2,761,051
CONTROL FOR ELECTRIC HEATING ELEMENTS
Filed Aug. 28, 1952 2 Sheets-Sheet 1

INVENTOR.
Norman G. Dodson
BY
J. K. Mosser
AGENT

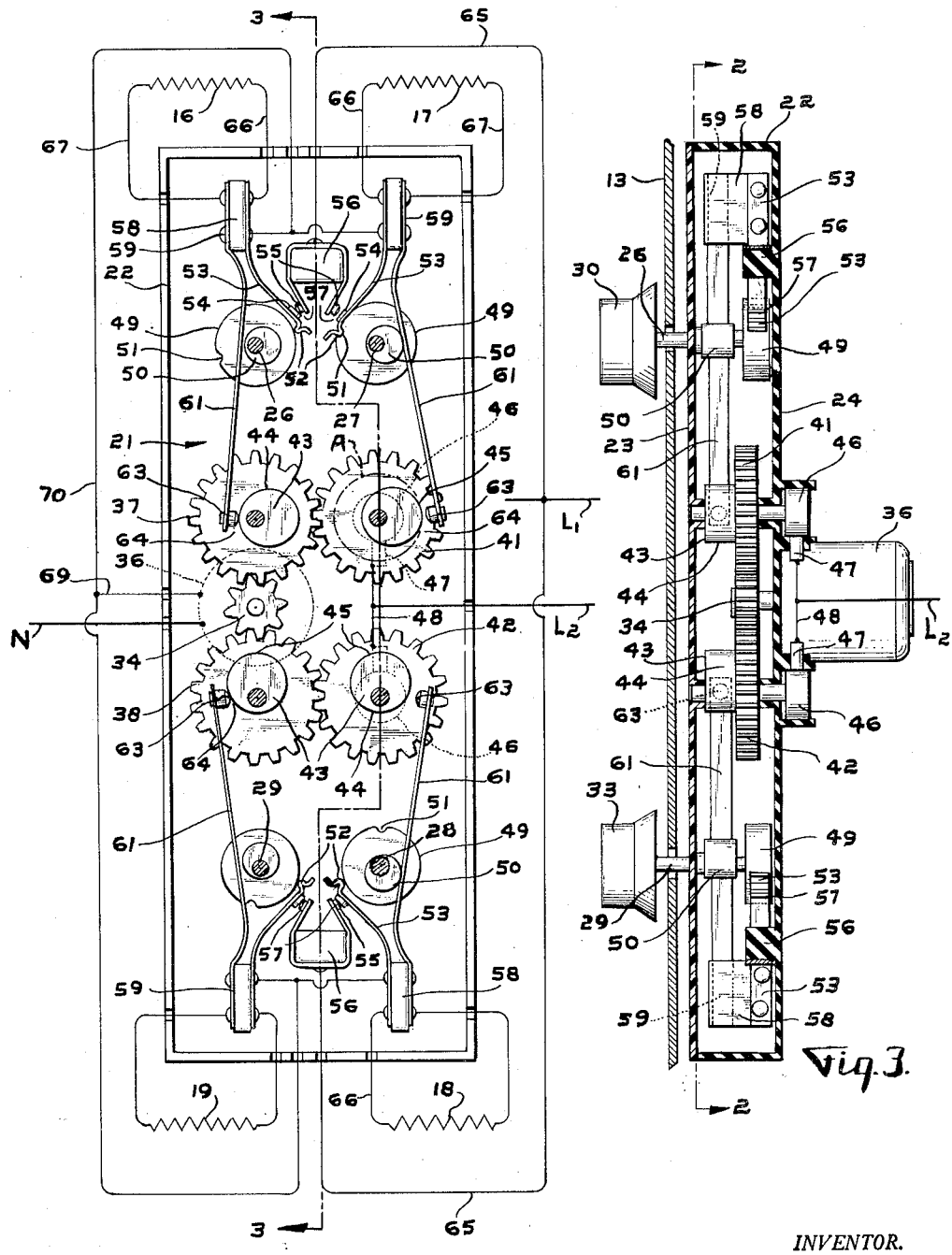

United States Patent Office 2,761,051
Patented Aug. 28, 1956

2,761,051

CONTROL FOR ELECTRIC HEATING ELEMENTS

Norman G. Dodson, Milwaukee, Wis., assignor to The Maytag Company, Newton, Iowa, a corporation of Delaware Application August 28, 1952, Serial No. 306,748

8 Claims. (Cl. 219—20)

The invention relates to control apparatus for electric heating elements and more particularly to control apparatus for infinitely varying the average wattage input to the heating elements.

Heretofore, infinitely variable controls for heating elements have been rather complex in structure and have required a relatively large number of parts to be assembled to complete the unit which has resulted in a high unit cost.

In accordance with the invention, a plurality of electric heating elements are each provided with an infinite variable switch to control the average wattage input thereto. These switches are grouped about a rotating gear arrangement carrying individual eccentric contact cams, and at least one of the gears is connected to a slip ring, or rotates on a stub shaft, which is connected to one side of the line to form a part of the heating element circuit and eliminate some of the operating parts.

Accordingly, it is one of the objects of the invention to provide an electrical heating element with an infinitely variable control switch which utilizes a portion of the contact cam rotating mechanism in the electrical circuit.

It is another object of the invention to provide an electric heating element with an infinitely variable control switch which is simple in construction and utilizes a minimum number of parts.

It is still another object of the invention to provide electric heating elements with infinitely variable control switches which includes a locked gear train for rotating the contact cams and forms a part of the electrical circuit.

Other objects, features, capabilities, and advantages are comprehended by the invention, as will later appear and as are inherently possessed thereby.

Referring to the drawings:

Figure 2 is a diagrammatic vertical transverse sectional view including a wiring diagram for the infinitely variable control unit taken generally along the line 2—2 of Figure 3 and showing various positions of the cams and contacts;

Figure 3 is a longitudinal vertical sectional view of the control unit taken generally along the line 3—3 of Figure 2;

Figure 1:
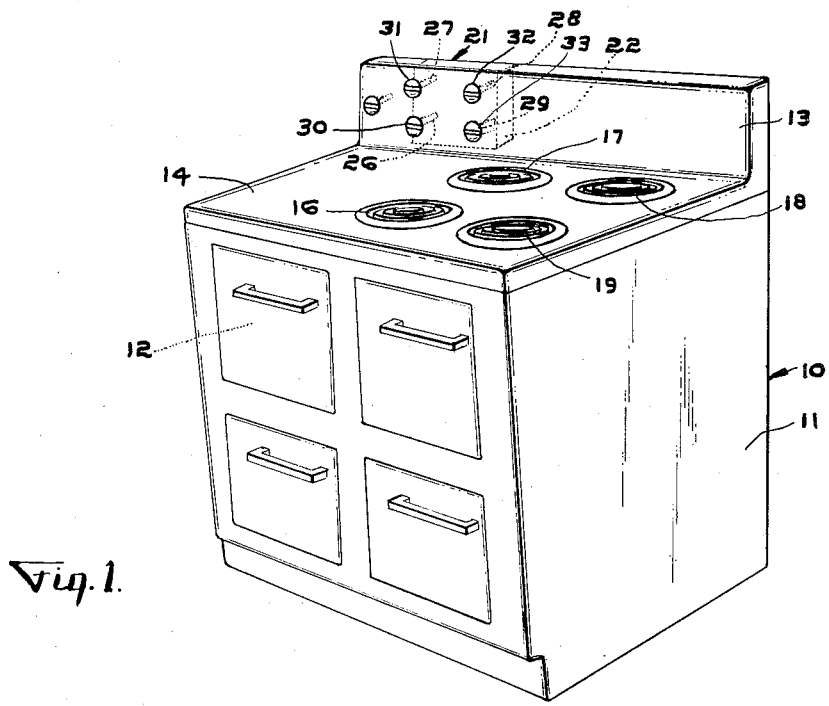
Figure 1 is a diagrammatic perspective view of an electric range having the infinitely variable control assembly applied thereto for controlling the surface heating elements.

Referring now to the drawings for an embodiment of the improved infinite control mechanism applied to electric heating apparatus, there is shown in Figure 1 an electric range 10 of any suitable construction including the usual frame and cabinet construction 11, oven 12, back or splash panel 13 and top wall 14 which supports four electric heating element surface units 16, 17, 18 and 19. The surface units are preferably of the single element construction and are under control of an infinitely variable control mechanism generally referred to at 21 mounted on the splash panel 13 or any other convenient location.

An insulated casing 22 including front and back walls 23 and 24, respectively, houses the control mechanism 21 and four separate and parallel control shafts 26, 27, 28 and 29 project through the front wall 23 and the splash panel 13. The outwardly projecting ends of these shafts carry control knobs 30, 31, 32 and 33, respectively, which are adapted to be grasped by the operator to selectively rotate the same to infinitely control the surface units in a manner to be hereinafter described.

Referring more particularly to Figures 2 and 3, the control mechanism 21 within the casing 22 includes an insulated pinion gear 34, driven by a low capacity constant speed motor 36 through suitable gear reduction mechanism. The insulated pinion is in constant mesh with a pair of oppositely spaced driven metallic gears 37 and 38, journalled for parallel rotation within the casing at the front and back walls 23 and 24, respectively. A similarly toothed metallic gear 41 is mounted for parallel rotation in mesh with the driven gear 37 and a metallic gear 42 is similarly mounted in mesh with the gear 38. Thus, when the insulated pinion gear 34 is rotated by the constant speed motor 36, the train of driven gears 37, 38, 41 and 42 are all rotated in unison and at the same rate of speed.

Projecting outwardly from one side of each driven gear is an integral cam 43 which provides a rotating contact surface 44 disposed eccentric to the axis of rotation of its respective gear, and the point of maximum eccentricity or crest 45 of each cam is preferably out of phase with each other for a purpose to be hereinafter described. One or more of the gears has a disc shaped rotating portion projecting from the back wall of the casing to provide a slip ring 46 engaged by suitable brush means 47 which in turn is directly connected to the line $L_2$ by means of a conductor 48. An arrangement of this type places the metallic gearing 37, 38, 41 and 42 in the electrical circuit for the heating elements 16, 17, 18 and 19 from the line $L_2$.

The control shafts 26, 27, 28 and 29 carrying their control knobs 30, 31, 32 and 43, respectively, are journalled in the front and back walls of the casing and are disposed outwardly from and in parallel spaced relation to the axes of the gear train and each control shaft has rigidly secured thereon a pair of spaced insulated control cams 49 and 50. Each control cam 49 has a generally circular periphery concentric to its control shaft and has a notch or recess 51 therein for receiving a cam follower 52 formed as part of a movable contact carrying arm 53. Each arm has a contact 54 thereon adjacent its free end that is adapted to engage a substantially stationary contact 55 mounted on a slightly flexible arm which is secured to an insulating block 56. Each set of contacts 54 and 55 constitute a control switch 57 for energizing the control motor 36 and for conditioning its associated heating element for energization from the line $L_1$. The other insulated control cam 50 is mounted eccentric to its control shaft axis and is rotatable by the control shaft when its associated control knob is manipulated.

Spaced outwardly from each control shaft is an insulated anchor block 58 to which is attached the outer anchored ends of the movable contact arms 53 for the motor control switches 57 and the outer anchored ends 59 of movable resilient or spring arms 61. Each arm has a free or movable end projecting in the direction of and terminating adjacent its respective rotatable eccentric cam 43. Each spring arm carries a contact 63 adjacent its free end which is adapted to engage one of the rotating eccentric cam surfaces 44 under certain conditions of operation and the cam 43 and contact 63 provide elements of a heating element switch 64. The control eccentric cam 50 mounted on each of the control shafts engages the mating spring arm 61 intermediate its anchored and free ends to selectively shift or limit the movement of the contact 63 to an infinite number of positions with respect to one of the rotatable cams 43. In the arrangement shown, all of the spring arms 61 are mounted and pre-stressed so that they will move inwardly toward and rest against their respective eccentrically mounted control cam 50 under normal conditions.

As shown in Figure 2, each heating element is connected in series with a pair of the switches 57 and 64 and is capable of independent energization from the line $L_1$ and common conductor 65 through its circuit and motor switch 57 and conductor 66 to the heating elements 16, 17, 18 or 19, and from the heating elements through a conductor 67 to the heating element or spring contact switch 64 which engages the proper eccentric 43 carried by one of the metallic gears in the train. From this point the circuit is completed from the gears 37 and 38 through the contacting teeth of the meshing gears 41 and 42 which are in turn directly connected to the slip ring 46 and brush 47 by means of the conductor 48 to the line $L_2$. Also, one side of the drive motor 36 is connected to the neutral N and the other side is connected through common cross conductors 69 and 70 to the normally open side of the motor circuit switches 57 at the blocks 58 and through the switches 57 and conductor 65 to the line $L_1$. Thus, when any of the control shafts 26, 27, 28 and 29 are actuated or rotated to force the cam followers 52 from the recesses 51 in the circular cams 49, the circuit to the drive motor 36 is completed by the particular switch 57 actuated and the motor will rotate the gear train.

In operation, when the control shafts 26, 27, 28 and 29 are in their "off" positions, the switches 57 and 64 are all open. Thus, the cam followers 52 are in their respective grooves or slots 51 in the circular cams 49 and the crests of the control eccentric cams 50 hold the contacts 63 at the free ends of the heating element switch arms 61 outwardly to their maximum extent. In this condition, the control cams 49 and 50 on the control shafts will all be in the position as shown in the upper right hand section of Figure 2.

Now, assuming the operator manipulates the control knobs to the positions shown in Figure 2, that is, the knob 31 for the shaft 27 is left in its "off" position, the knob 30 for the shaft 26 is moved to its "high" heat position and the knobs 32 and 33 for the shafts 28 and 29 are moved to positions intermediate the "high" and "off" positions.

Upon actuation of the first control shaft 26, for example, the follower 52 for the movable arm 53 is forced out of the recess 51 in the cylindrical cam 49 and shifts the movable contact 54 carried thereon to engage its mating stationary contact 55. This action closes the switch 57 and simultaneously conditions the heating element 16 for energization from the line $L_1$ and energizes the drive motor 36 from the line $L_1$ to the neutral N regardless of the open position of any of the other contacts. Upon energization of the motor, the pinion gear 34 begins to rotate which in turn rotates all of the meshing gears in the train at the same speed. With the gear train rotating it is obvious the eccentric cams 43 are all simultaneously rotated together and that the outer or crested portions 45 will move in a circle as indicated by the dot and dash line A.

At the same time the control shaft 26 is rotated to energize the motor, the crest portion of the control eccentric cam 50 is also moved in a direction away from the spring arm 61 or inwardly. Since the pre-stressed spring arm 61 continues to ride on the eccentric control cam surface, its free end is automatically moved inwardly or toward its mating eccentric contact surface 44 on the gear 37. Assuming the operator moves the control knob 30 to its "high" heat position, the eccentric cam 50 on the control shaft 26 is moved out of contact with the spring arm 61 and in so doing the movable contact 63 engages the eccentric cam surface 44 on the gear to close the switch 64 and continuously ride or remain in contact therewith. Upon contact with the eccentric cam surface 44, the heating element circuit is completed from the line $L_2$ and the heating element 16 is continuously energized at its maximum rated capacity.

Next, if the operator actuates or adjusts the control shaft 28 to its "low" heat position, it can be seen that its switch 57 is closed; however, since the motor 36 is already energized the closing of the contacts 54 and 55 merely conditions the heating element 18 for energization from the line $L_1$. In this instance, the control shaft 28 and crest of the control eccentric 50 is only rotated a relatively short distance from its "off" position; thus, the inward movement of the spring arm 61 carrying its movable contact 63 is limited and it is held in this newly selected position by the eccentric control cam 50, just slightly within the arc prescribed by the crest 45 of its rotating cam 43. Therefore, as the cam 43 is rotated the cam surface 44 will engage the movable contact 63 for a relatively short period or portion of a revolution and it is only during this interval when the contact 63 engages the rotating cam 43 that the heating element 18 is energized. As the cam 43 engages the contact 63 it moves the spring arm 61 outwardly away from the control cam 50 on the control shaft 28, and after the crest 45 passes by, the movable contact continues to move inwardly until the spring arm 61 again engages the control cam 50. This arrests further inward movement of the movable contact 63 and the heating element 18 is deenergized and remains so for the rest of the revolution of the cam until the leading surface adjacent the crest portion 45 is again moved into contact with the movable contact 63. In this manner, maximum voltage is applied to the heating element 18 whenever switch 64 is closed and since the "on" interval is relatively short with respect to the "off" interval, the heating element 18 will assume an average overall "low" heat condition which results in a low average wattage input.

Under conditions wherein the operator wishes a relatively "hot" surface unit, the control knob 33 in the example shown, is rotated in the same manner as previously described and the controls are moved similarly; however, in this instance, the eccentric control cam 50 on the shaft 29 is rotated further and approaches the "high" position, which, of course, permits the movable contact 63 on the spring arm 61 to move inwardly towards its rotating eccentric cam surface 44 a greater distance. This results in having the contact 63 engage the rotating excentric cam surface 44 for a major portion of the revolution and the circuit is only broken by the control cam 50 for a relatively short interval. Thus, the interval when the heating element 19 is energized or "on" with respect to the "off" interval has been reversed and the average temperature will then approach the heating element in the "high" position and the overall average wattage input is increased.

It is obvious that any of the control knobs may be moved to any of a multiplicity or infinite number of positions at will to automatically shift the position of the movable contact 63 with respect to its rotating cam 43 and result in a change in the average temperature from the "off" to the "high" heat position. An arrangement of this type eliminates the necessity of double heating elements and special switching arrangements which require 110 and 220 volt connections plus series and parallel combinations to give multiple heats and which have the disadvantage of set or fixed operating temperatures for each specific setting. Also, by having the crests of the rotating cams disposed out of phase the peak loads on the source of supply may be reduced or spread out during a given period of time.

At the end of the cooking operation, the operator merely turns the control knobs to their "off" positions and when the last knob is moved to its "off" position it automatically opens the motor circuit to stop the rotation of the gears and terminate the operation of the control mechanism. At the same time the eccentric control cams 50 will have moved the movable contacts 63 in the heating element switches 64 outwardly away from the rotatable contact cams 43.

Figures 4, 5:
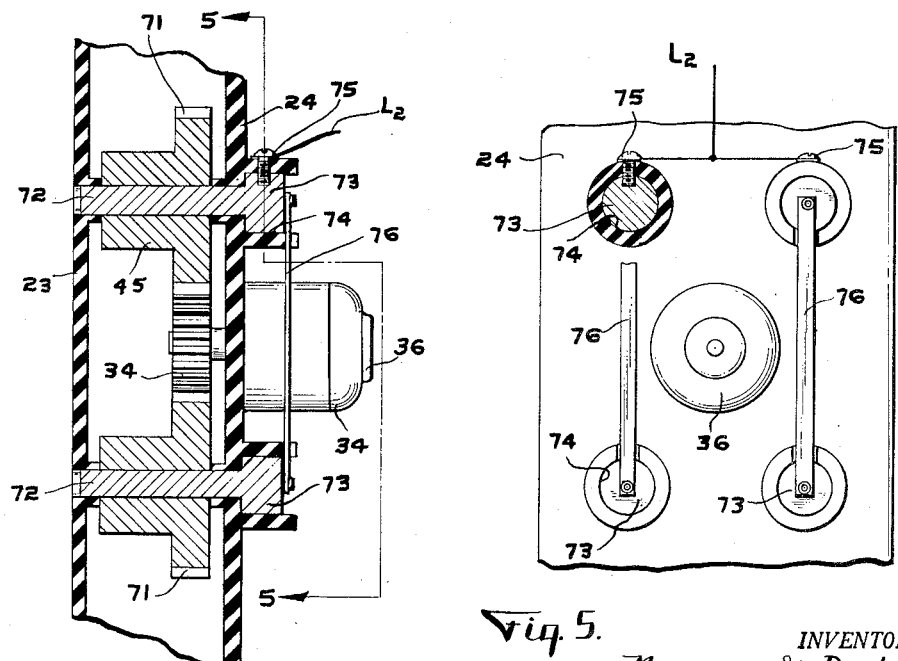
Figure 4 is a partial vertical sectional view similar to Figure 3 but showing a modified cam and gear mounting and energizing means for the heating element circuit; and, Figure 5 is a back plan view taken generally along the line 5—5 of Figure 4 showing an electrical cross connection for the gearing.

In Figures 4 and 5 there is shown a slightly modified means for energizing the motor 36 and heating elements from the line $L_2$. In this instance, the pinion 34 meshes with a plurality of driven gears 71 in the usual manner; however, the gears are journalled on metallic stub shafts 72 mounted in front and the back walls 23 and 24, respectively, of the insulating casing 22. Each stub shaft 72 projects through the back portion of the casing and is provided with an enlarger boss 73 fitting within a recess 74 to anchor the same and they are electrically connected to the line $L_2$ by means of a set screw or the like 75. If necessary, straps 76 may be cross connected between the enlarged bosses 73 on the stub shafts and the line $L_2$ to reduce the electrical resistance between the meshing teeth of the driven gears 71. Under these conditions, the sliding contact in the electrical circuit will be between the central portion of the stub shaft 72 and bearing surface of the gear 71 and the rotating cam surface 44 and contact 63.

From the foregoing it can be seen that an infinitely variable control mechanism has been provided for the surface units of an electric range which is simple in construction and operation, is compact and includes a minimum number of parts. Also, by shifting the phase relation of the eccentric contacts the overall peak loads on the source of supply may be spread out over a longer portion of the rotating cycle.

While I have herein described and upon the drawings shown illustrative embodiments of the invention, it is to be understood that the invention is not limited thereto but may comprehend other constructions, arrangements of parts, details and features without departing from the spirit of the invention.

It is claimed:

1. In an infinite control for an electric heating element in a heating element circuit, the combination of a control shaft including means for selectively rotating said shaft, a motor switch, a notched concentric cam carried by said shaft for actuating said motor switch, a motor energized upon actuation of said motor switch, metallic gear means connected in series with said heating element circuit driven by said motor, a rotatable electrical conducting contact formed integral with said gear means but eccentric to its axis, a movable arm carrying a contact thereon for engaging said eccentrically mounted rotatable contact to energize said heating element therethrough, and an eccentric control cam carried by said control shaft being operable to position said movable contact with respect to said rotatable electrical conducting contact to vary the arc of contact therebetween.

2. An infinite control for a plurality of electric heating elements, comprising a heating element circuit for each heating element, a drive motor, a motor circuit connected in part with said heating element circuits, a gear train including a plurality of meshing metallic gears each carrying an eccentric metallic cam to provide a rotatable electrical conducting contact surface rotatable by said motor, means for connecting said gears and cams in the heating element circuits, a spring arm having an anchored end and a movable end carrying a contact thereat for each rotatable eccentric cam, said contact on each spring arm being biased toward its respective rotatable eccentric electrical contact cam surface, a control shaft for each arm disposed between the anchored and movable ends, a second movable arm having a contact thereon disposed adjacent each control shaft and forming part of the motor and heating element circuits, a pair of insulated cams carried by and rotatable with each control shaft, one of said cams being operative upon rotation of said shafts to close the motor circuit to energize said motor to rotate said meshing gears and eccentric cams and to condition the selected heating element circuit for operation, and the other of said cams being eccentrically mounted with respect to said control shafts and engaged by its mating spring arm to limit the movement of the movable contact in the direction of its mating rotatable contact surface, and manually operable means for selectively and individually rotating said control shafts to first energize said drive motor to rotate said eccentric contact surfaces in unison and to position the contacts on said movable arms with respect to their mating rotating eccentric contact surfaces to energize the selected heating elements, the total engagement of said last mentioned contacts in each revolution of said gears being limited by the position of said control cams to thereby limit the average wattage input to the selected heating elements.

3. In an electric circuit containing a heating element, an infinite control for said heating element comprising a motor, a gear driven by said motor, an eccentric cam attached to said gear and electrically connected with said heating element, a movable arm resiliently biased toward said eccentric cam and carrying a contact engaging said eccentric cam to complete said circuit, a switch for energizing said motor, a control shaft, a switch cam on said control shaft engaging and controlling said switch, and a control cam on said control shaft engaging and controlling the relative position of said arm with respect to said eccentric cam to limit the arcuate contact between said contact and said eccentric cam when said motor is energized.

4. An infinite control for a plurality of heating elements contained in a plurality of separate electric circuits, said control comprising an eccentric cam electrically connected in each of said circuits, a driven gear attached to each of said eccentric cams for rotating each of said eccentric cams, a motor carrying a driving gear for rotating said driven gears, a movable arm electrically connected in each of said separate circuits and resiliently urged toward each respective eccentric cam to close each of said separate circuits, a control shaft adjacent each respective arm, a cam attached to each of said control shafts to move each respective arm towards and away from each respective eccentric cam, a motor switch adjacent each control shaft, and a cam carried by each of said control shafts engaging and controlling each of said motor switches to energize said motor upon rotation of any of said control shafts.

5. An infinite control for an electric heating element in an electric circuit, said control comprising a drive motor, a switch for energizing said motor, a metallic gear driven by said motor, an eccentric cam formed as an integral part of said gear and electrically connected in said circuit to provide a rotating contact for said circuit, a movable arm connected in said circuit and resiliently biased towards said eccentric cam to contact said eccentric cam and close said circuit, a rotatable control shaft, a first insulated cam carried on said shaft and engaging said switch to energize said motor when said shaft is rotated, and a second insulated cam carried on said shaft and engaging said arm to control the movement of said arm towards said eccentric cam to limit the arcuate contact between said arm and said eccentric cam when said motor is energized.

6. In an electric circuit containing a heating element, an infinite control for said heating element comprising a rotatable eccentric contact electrically connected in said circuit, means for continuously rotating said eccentric contact at a constant speed, a movable arm electrically connected in said circuit and resiliently biased towards said eccentric contact to make an electrical connection with said eccentric contact by a cyclic wiping engagement therewith, a rotatable control shaft, and a control cam carried by said control shaft and engaging said arm to control the duration of said wiping engagement between said arm and said rotatable eccentric contact.

7. In an electric circuit containing a heating element, an infinite control for said heating element comprising a rotatable eccentric contact electrically connected in said circuit, means for continuously rotating said eccentric contact at a constant speed, a switch for controlling said means, a movable arm electrically connected in said circuit and resiliently biased towards said eccentric contact to make an electrical connection with said eccentric contact by a cyclic wiping engagement therewith, a rotatable control shaft, a switch cam on said control shaft controlling said switch, and a control cam carried by said control shaft and engaging said arm to control the duration of said wiping engagement between said arm and said rotatable eccentric contact.

8. In an electric circuit containing a heating element, an infinite control for said heating element comprising a rotatable contact cam electrically connected in said circuit, means including a motor for continuously rotating said contact cam, a switch for controlling said motor, a movable arm electrically connected in said circuit and resiliently biased towards said contact cam to make an electrical connection with said contact cam, a rotatable control shaft, a switch cam on said control shaft controlling said switch, and a control cam carried by said control shaft and engaging said arm to control the electrical connection between said arm and said rotatable contact cam.

References Cited in the file of this patent

UNITED STATES PATENTS

| | | |
|---|---|---|
| 1,541,600 | Steenstrup | June 9, 1925 |
| 1,665,014 | Beckworth | Apr. 3, 1928 |
| 2,219,372 | Poole | Oct. 29, 1940 |
| 2,294,573 | Potter | Sept. 1, 1942 |
| 2,445,021 | Clark | July 13, 1948 |
| 2,503,082 | Tuttle | Apr. 4, 1950 |
| 2,572,553 | Wojcik | Oct. 23, 1951 |
| 2,599,171 | Freeman | June 3, 1952 |